United States Patent
Mathis

(10) Patent No.: US 10,907,102 B2
(45) Date of Patent: Feb. 2, 2021

(54) SYSTEM AND METHOD FOR PYROLYSIS OF A BIOMASS

(71) Applicant: Confluence Energy, LLC, Kremmling, CO (US)

(72) Inventor: Mark Joseph Mathis, Silverthorne, CO (US)

(73) Assignee: Confluence Energy, LLC, Kremmling, CO (US)

( * ) Notice: Subject to any disclaimer, the term of this patent is extended or adjusted under 35 U.S.C. 154(b) by 1140 days.

(21) Appl. No.: 14/800,562

(22) Filed: Jul. 15, 2015

(65) Prior Publication Data

US 2016/0017233 A1 Jan. 21, 2016

Related U.S. Application Data

(60) Provisional application No. 62/024,842, filed on Jul. 15, 2014.

(51) Int. Cl.
| | |
|---|---|
| *F23G 5/12* | (2006.01) |
| *C10B 53/02* | (2006.01) |
| *C10B 47/42* | (2006.01) |
| *C10B 47/44* | (2006.01) |
| *C01B 32/318* | (2017.01) |

(52) U.S. Cl.
CPC .......... *C10B 53/02* (2013.01); *C01B 32/318* (2017.08); *C10B 47/42* (2013.01); *C10B 47/44* (2013.01); *Y02E 50/10* (2013.01); *Y02P 20/145* (2015.11)

(58) Field of Classification Search
CPC ......... C10B 53/02; C10B 49/16; C10B 47/30; C10B 47/44; C10B 53/00; C10B 7/10; C10B 1/10; C10B 49/04; C10B 1/04; C10B 45/02; C10B 47/12; C10B 49/12
See application file for complete search history.

(56) References Cited

U.S. PATENT DOCUMENTS

| | | | | |
|---|---|---|---|---|
| 3,875,077 | A * | 4/1975 | Sanga | C01B 31/081 201/2.5 |
| 4,618,735 | A * | 10/1986 | Bridle | C02F 11/10 201/2.5 |
| 5,181,989 | A * | 1/1993 | White | B01F 7/00141 162/241 |
| 5,589,599 | A * | 12/1996 | McMullen | C01B 31/08 208/13 |
| 2003/0010266 | A1* | 1/2003 | Ballantine | C10B 47/44 110/229 |
| 2009/0250331 | A1* | 10/2009 | Hopkins | C10B 47/44 201/6 |

(Continued)

*Primary Examiner* — Jason Lau
(74) *Attorney, Agent, or Firm* — Polsinelli PC

(57) ABSTRACT

A system for pyrolysis of a biomass including a furnace and a reactor. The furnace includes a combustion chamber. The furnace configured for generating thermal energy from combustion within the combustion chamber and supplying the thermal energy to at least one operation within a biomass facility. The reactor may include a pyrolysis chamber. The pyrolysis chamber configured to house a preprocessed biomass feedstock therein. The pyrolysis chamber may be positioned at least partially within the combustion chamber of the furnace such that the preprocessed biomass feedstock is pyrolyzed by the thermal energy within the combustion chamber of the furnace.

25 Claims, 6 Drawing Sheets

(56) References Cited

U.S. PATENT DOCUMENTS

| | | | |
|---|---|---|---|
| 2011/0219640 A1* | 9/2011 | Latos | F26B 23/02 34/487 |
| 2012/0063965 A1* | 3/2012 | Coates | C10B 47/30 422/164 |
| 2013/0011803 A1* | 1/2013 | Siemons | B01J 6/008 432/9 |
| 2013/0153395 A1* | 6/2013 | Carney | C10J 3/482 201/31 |

* cited by examiner

SYSTEM AND METHOD FOR PYROLYSIS OF A BIOMASS

CROSS-REFERENCE TO RELATED APPLICATIONS

The present application claims priority under 35 U.S.C. § 119 to U.S. Provisional Patent Application No. 62/024,842, filed on Jul. 15, 2014, titled "SYSTEM AND METHOD FOR PYROLYSIS OF A BIOMASS", which is hereby incorporated by reference in its entirety into the present application.

TECHNICAL FIELD

Aspects of the present disclosure involve systems and methods for pyrolysis of a biomass, and, more particularly, to activated carbon or biochar production within a biomass, cogen, lumber mill, or word processing facility, among others.

BACKGROUND

Many industries rely on biomass in their daily operations. Traditional industries, such a chip, pellet, oriented strand board (OSB) plants, particle board plants, plywood plants, and lumber mills, rely on biomass in the processing of wood into wood products. Other industries, such as biomass power generation plants, rely on multiple forms of biomass (e.g., fibrous materials, animal manures, municipal solid waste) to convert the biomass energy including electrical and thermal products. In these industries and others, there are opportunities to more efficiently use resources and reduce waste products.

With these thoughts in mind, among others, aspects of the exhaust air duct system disclosed herein were conceived.

SUMMARY

Aspects of the present disclosure involve a system for pyrolysis of a biomass. The system includes a furnace and a reactor. The furnace includes a combustion chamber. The furnace may be configured for generating thermal energy from combustion within the combustion chamber and supplying the thermal energy to at least one operation within a biomass facility. The reactor may include a pyrolysis chamber. The pyrolysis chamber may be configured to house a preprocessed biomass feedstock therein. The pyrolysis chamber may be positioned at least partially within the combustion chamber of the furnace such that the preprocessed biomass feedstock is pyrolyzed by the thermal energy within the combustion chamber of the furnace.

Aspects of the present disclosure may also involve a method of pyrolysis of a biomass. The method may include pyrolyzing a preprocessed biomass feedstock in a reactor that is at least partially positioned within a combustion chamber of a furnace. The furnace may generate thermal energy by combustion within the combustion chamber and supply the thermal energy to at least one operation within a biomass facility that processes the preprocessed biomass feedstock prior to the pyrolyzing.

Aspects of the present disclosure also involve a gasification driven pyrolysis system including a furnace and a reactor. The furnace may include a combustion chamber and the furnace may be configured for generating thermal energy from combustion within the combustion chamber. The reactor may include a pyrolysis chamber and a first volatile port. The pyrolysis chamber may be configured to house a biomass feedstock therein. The pyrolysis chamber may be positioned at least partially within the combustion chamber of the furnace such that the biomass feedstock is pyrolyzed by the thermal energy within the combustion chamber of the furnace. The first volatile port may include a first opening within the pyrolysis chamber and a second opening within the combustion chamber of the furnace. The first volatile port may be configured to provide a passageway for volatiles to travel from the first opening to the second opening for combusting within the combustion chamber.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Figure 1:
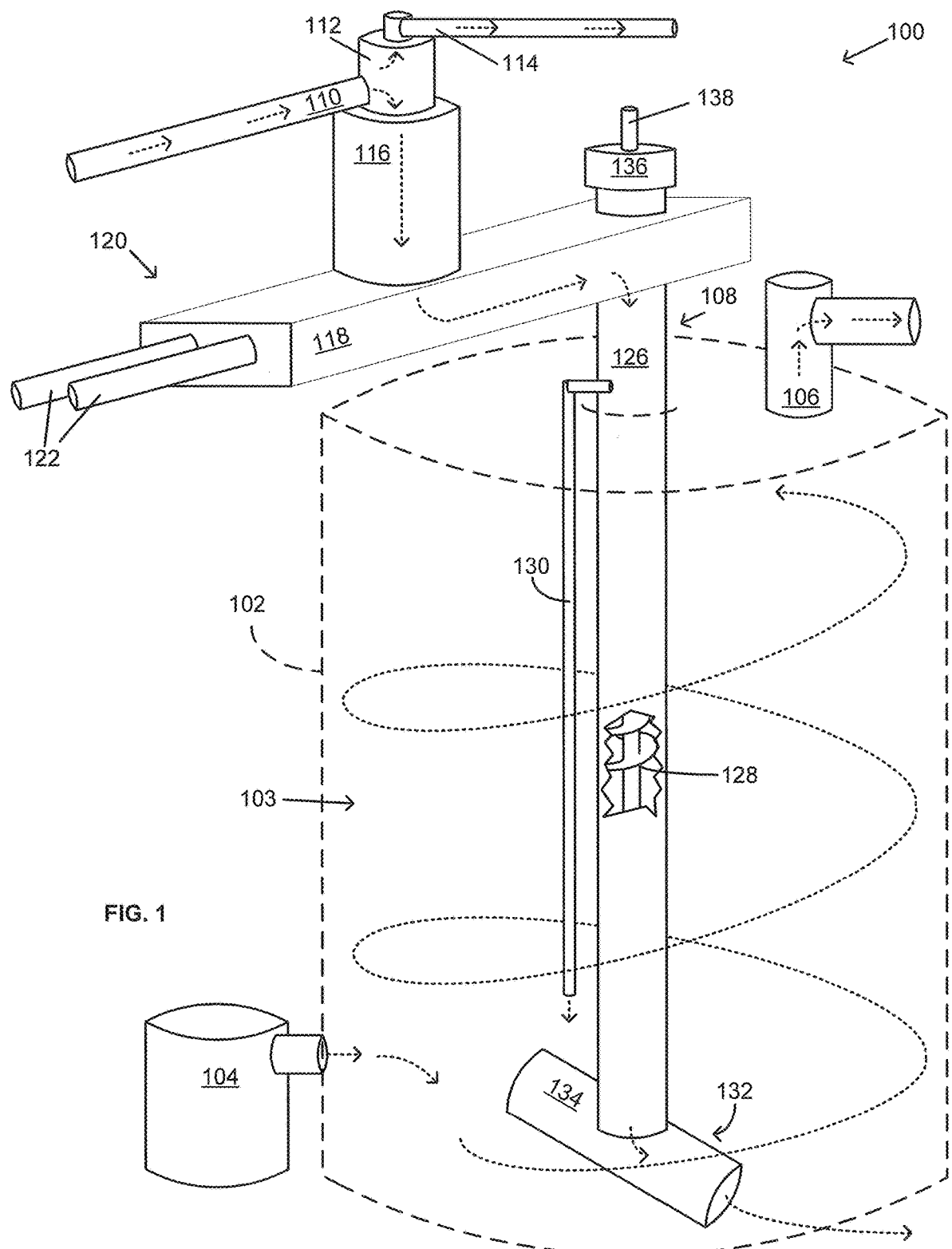
FIG. 1 depicts an isometric view of an activated carbon/biochar or fixed carbon product production system.

Aspects of the present disclosure involve a biomass pyrolysis system and method of use. Aspects of the present disclosure also involve a gasification driven pyrolysis system and method of use. The systems and methods can produce activated carbon or "biochar" from organic or inorganic materials within existing biomass facilities.

The term "biomass" describes any biologic material that is derived from a living organism. Examples of biomass include plant-based material, such as wood and any other residual portions of a tree (e.g., leaves, branches), as well as animal waste (e.g., chicken litter/manure). Biomass also includes the plant-based material in a processed form, such as pulp, paper, lumber, cotton, wood chips, wood pellets, and plywood, among others. Often, industries that process biomass (e.g., pellet mill) and/or use biomass (e.g., biomass power generation plant) will have a furnace or heater at their respective plant. For example, a chip mill may process all portions of a tree into wood chips (hereinafter referred to simply as "chips") that will ultimately be used as a solid fuel in an electrical power generation plant. Because the chips were recently a living organism, the chips may have a moisture content that is too high and/or variable to be used as a solid fuel. Thus, the chips must be dried, in addition to cut to size, until the moisture content is at a certain threshold. Similarly, a lumber mill may process recently-living tree trunks into lumber and other wood products. As with the chips, the lumber may require cutting and drying in order to be suitable for consumer applications. As such, a furnace or dryer may be used in each context to dry the chips or lumber products.

A biomass power generation plant, on the other hand, may include a furnace or combustion chamber for burning the solid fuel, or other biomass fuels processed by the previously described biomass facility. The furnace at this type of facility may be used for drying purposes, but also may be used directly in the generation of power. For example, the furnace or combustion chamber may heat fluid in a heat exchanger, which circulates high-pressure steam through a boiler and, then, through a steam turbine, which is coupled with a generator that generates electricity.

In the wood pellet/chip or the lumber mill context, a biomass furnace is used in the drying of biomass products. Biomass dryers come in a variety of types and configurations, such as bed dryers, rotary drum dryers, vertical silo-type dryers, or belt dryer, among others. In some cases, the biomass furnace generates heat and supplies the heat for the drying operation and in some cases the biomass furnace receives thermal energy from another part of the industrial facility, such as a separate biogas plant. In the case of a biomass furnace that generates and supplies heat, the furnace often uses the biomass as a fuel. For example, a wood chip or pellet plant may yield sawdust as a byproduct in the production process, and the plant may use the sawdust (or the chips or pellets) as a fuel or a catalyst in the furnace, which in turn will produce heat to dry the chips, fibers, or pellets.

In either a biomass production facility or a biomass power generation plant, among other industrial facilities, there is an opportunity for additional processing of the biomass product or a portion of the supply of the biomass product into an activated carbon or "biochar" via a carbonization process where the biomass is pyrolyzed. Pyrolysis is a thermochemical decomposition of the biomass at high temperatures (e.g., 400-1200 Celsius) in an oxygen deprived, or nearly deprived, environment. The lack of oxygen prevents combustion while removing water and other volatile constituents from the biomass. During pyrolysis, the biomass is converted to an activated carbon or "biochar," which is beneficial for many purposes, including water filtration, horticulture, carbon sequestration, industrial fuel, etc. While biochar or activated carbon is often produced in a facility or plant that is dedicated to its production, existing biomass production facilities and biomass power generation plants, among other industrial facilities, can use existing biomass products, which may have been preprocessed for moisture content and size, as feedstock and can produce activated carbon with certain modifications to their systems, as will be described below. Additionally, the volatile constituents may be burned/ignited within the furnace to enhance the thermal energy within the furnace.

Referring to FIG. 1, which is an isometric view of a system 100 for pyrolysis of a biomass, the system 100 includes a biomass furnace or burner 102 (shown in dotted line) of a biomass production facility or plant (e.g., wood chip/pellet plant, lumber mill) or a biomass power generation plant. The biomass furnace 102 includes a chamber 103 on an internal side of the furnace and a fan 104 for introducing a biomass product (e.g., saw dust) and/or other combustibles (e.g., natural gas) into the chamber 103 of the furnace 102. The biomass product and other combustibles are used for fueling the combustion within the furnace 102, and are a convenient source of fuel considering the biomass can be a byproduct of other processes within the facility.

As seen in FIG. 1, the furnace 102 may be a cyclonic furnace, where the combustibles are caused to move cyclonically around the chamber 103 of the furnace 102. The furnace 102 also includes an exhaust port 106 for exhausting heated air, and various gases from the combustion, out of the furnace 102 and to other areas within the facility. The exhausted air may, for example, be used for drying wood chips/pellets or lumber.

In the system 100 described herein, the biomass facility, or more particularly, the furnace 102, functions as normal; the furnace 102 generates thermal energy and supplies the thermal energy to processes (e.g., drying operations, thermal needs) within the facility. However, a portion of the preprocessed biomass feedstock (e.g., wood chips/pellets that are cut to size and/or dried) can be routed to the system described herein to generate activated carbon, using the existing infrastructure of the facility. For example, all or 100% of the biomass feedstock, which may include wood chips, wood pellets, sawdust, or animal waste, among other feedstocks, may be dried in a dryer, which is supplied hot air from the furnace 102, and a first portion or first percentage (e.g., 10%, 60%) of the biomass feedstock may be filtered by size and routed into the system described herein to generate activated carbon, while a second portion or second percentage (e.g., 90%, 40%) of the biomass feedstock is used in another operation or process (e.g., primary operation) within the facility. In this way, the facility can function normally and consistent with its primary operation, while a portion of the feedstock is re-routed though an alternative process, which results in an alternative end product. The system 100 described herein could also, for example, be used in a Syngas facility where hot air from the furnace is used to provide process heat for the facility's requirements, which may be to generate electricity or generate liquid fuels.

As stated above, biomass feedstock may be dried to ensure that the moisture content of the feedstock is consistent. Consistent moisture content is also helpful in the context of pyrolysis. Moisture variability within the feedstock can lead to inconsistent pyrolysis such as, for example, incomplete carbonization of the feedstock. In certain embodiments, the moisture content of the biomass feedstock may be about five percent by weight. In certain embodiments, the moisture content of the biomass feedstock may be about ten percent by weight. In certain embodiments, the moisture content of the biomass feedstock may be about fifteen percent by weight. In certain embodiments, the moisture content of the biomass feedstock may be about twenty percent by weight. In certain embodiments, the moisture content of the biomass feedstock may be about twenty-five percent by weight. In certain embodiments, the moisture content of the biomass feedstock may be about thirty percent by weight. In certain embodiments the moisture content of the biomass feedstock may be within a range of about five percent to about twenty percent. In certain embodiments the moisture content of the biomass feedstock may be within a range of about ten percent to about twenty percent. In certain embodiments the moisture content of the biomass feedstock may be within a range of about ten percent to about fifteen percent. In certain embodiments the moisture content of the biomass feedstock may be higher than thirty percent or lower than five percent.

As stated previously, the feedstock can be dried with a bed dryer, rotary drum dryer, vertical silo-type dryer, or belt dryer, among others. Assuming the feedstock is of a uniform size and shape, the feedstock can be reliably dried to a desired moisture content by subjecting the feedstock to the drying operation for a certain amount of time, which will likely be different for each desired moisture content and the size, original moisture content, and type of feedstock. The feedstock or samples thereof can be evaluated during the drying process to ensure the desired moisture content.

Turning back to FIG. 1, the system 100 further includes a reactor 108 for facilitating pyrolysis of a biomass. The reactor 108 is fitted at least partially within the chamber 103 of the furnace 102. The system 100 includes an intake port 110 for intaking a biomass product (e.g., chips, pellets), along with ambient air, and feeding the product to the reactor 108. As stated previously, the intake port 110 may be pneumatically coupled with the exhaust port 106, which supplies thermal energy to dry the biomass product prior entering the intake port 110. Additionally, the exhaust air from the exhaust port 106 may pneumatically drive or feed the biomass product into the intake port 110.

As stated previously, the biomass product may be produced or used elsewhere in the biomass production facility or power generation facility. All or a portion of a supply of the biomass product may be dried within a dryer. Then, a portion of the dried product may be routed to the intake port 110 and a remaining portion of the dried product may be routed to other processes or operations within the facility.

Referring still to FIG. 1, the intake port 110 can be a conveyor or auger, among other mechanisms to deliver the biomass product into the reactor 108. The intake port 110 leads to a separator 112, where the biomass and air are separated. The separator 112 may be a cyclonic separator, where rotational effects within the separator 112 facilitate the separation of the biomass products from the air. Stated simply, the relatively heavier biomass products falls downward, while high velocity air circles within the separator 112 and ultimately exits out a separator exhaust port 114 located at the top of the separator 112. The biomass products, now in an airlock or oxygen deprived environment, falls into a hopper 116, which temporarily houses or queues the biomass products before moving forward in the system. The hopper 116 is positioned atop and coupled to a housing 118 of a horizontal conveyor assembly 120, which conveys the biomass products from the bottom of the hopper 116 to a far end of the housing 118. The conveyor assembly 120 may include one or more shafts 122 coupled with augers 123, as will be described in more detail with reference to FIG. 2, below, facilitating conveyance of the biomass products from the hopper 116 to the far end of the housing 118.

Figure 2:
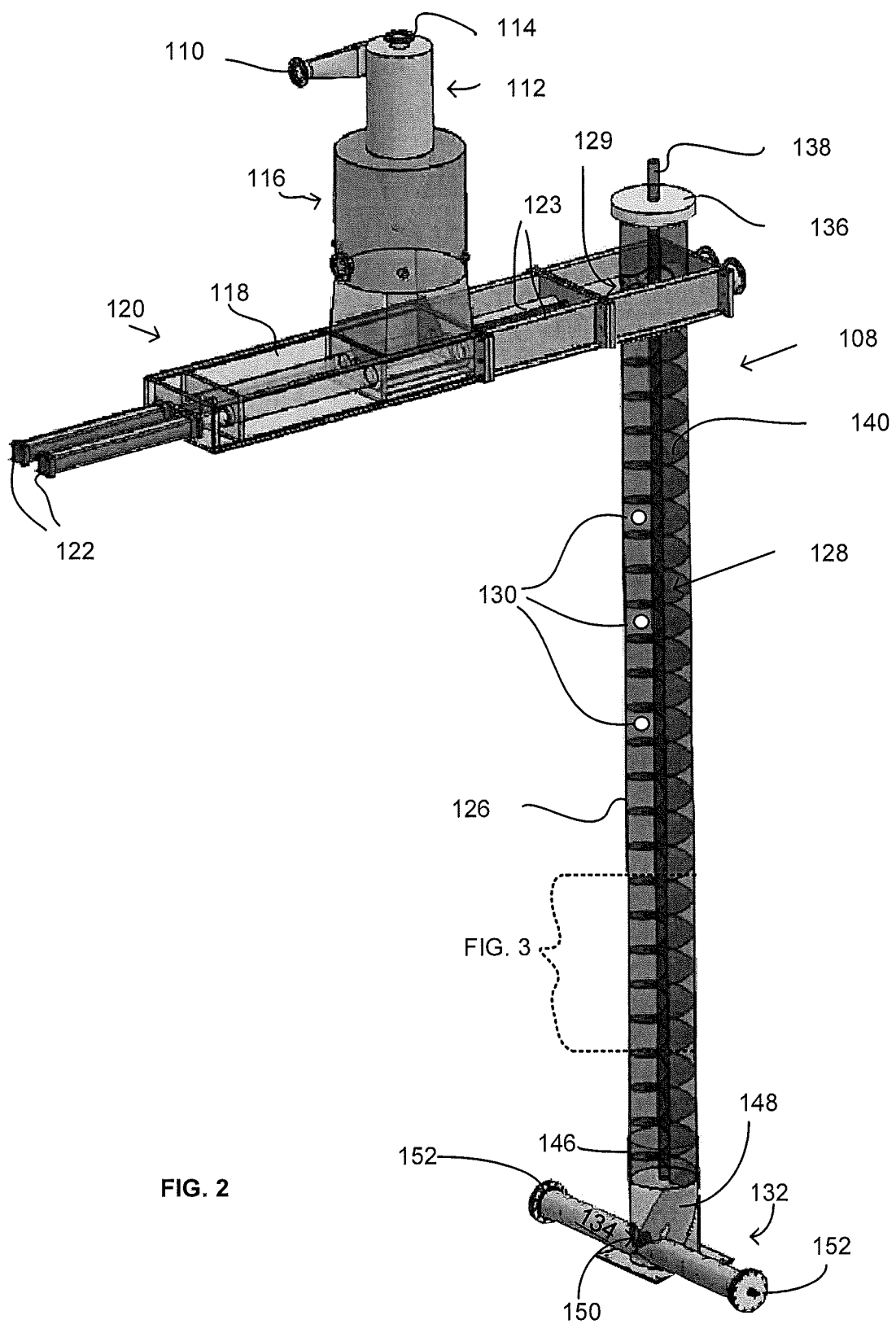
FIG. 2 depicts an isometric view of the activated carbon production system with an auger in the drop tube.

At the far end of the housing 118, and positioned centrally above the furnace 102, a drop tube or pyrolysis chamber 126 is coupled with the conveyor assembly 120. The drop tube 126 is hollow and extends from the conveyor assembly 120 down to the bottom of the furnace 102. The drop tube 126 can be standard tube steel with a wall thickness sufficient to handle the stress and heat of the furnace 102. The drop tube 126 may be constructed of two pieces as slip tube to allow for expansion and contraction. The drop tube 126 includes an opening 129 (as seen in FIG. 2) on a side of the tube 126 that is positioned on an interior space of the housing 118 of the conveyor assembly 120. Since the opening 129 is within the housing 118 of the conveyor assembly 120, an airlock is maintained within the drop tube 126 via the separator 112. The opening 129 is adapted to receive and be filled with a certain amount of the biomass product that is conveyed from the hopper 116. The reactor 108 may further include an agitation mechanism 128, which will be discussed further with respect to FIGS. 2-4, disposed within the drop tube 126 that is adapted to "shake-up" or mix the biomass products once the tube has been filled with the certain amount of biomass products. The agitation mechanism 128 may, for example, include an auger-type blade 140 that mixes or "fluffs" the biomass product to help ensure uniform mixing and, thus, uniform or at least substantially uniform pyrolysis of the biomass product in the drop tube 126.

As stated previously, the biomass product is conveyed from the hopper 116 across the conveyor assembly 120 and into an opening of the drop tube 126. The biomass product falls within the drop tube 126 and stacks at a bottom of the drop tube 126. Once an appropriate amount of biomass is housed within the tube 126, the opening 129 on the tube 126 can be mechanically closed by lowering or raising a sleeve fitting (not shown) with an inner diameter that is only slightly larger than an outer diameter of the drop tube 126 over the drop tube 126 opening 129. Then, the biomass product can be heated or "cooked" a desired amount of time or until a sufficient amount of pyrolysis has taken place. This amount of time is considered a residence time, which allows the user to make a range of materials from a dried product, a terrified product, a carbonized product, or a post carbon activated product.

Alternatively, since the opening 129 and, thus, the drop tube 126 and the housing 118 are in an air locked environment, the opening 129 may remain open during the pyrolysis of the biomass product within the drop tube 126. Then, once the furnace 102 is operating, the tube 126, and, thus, the biomass product is heated in a low or no oxygen environment. As the biomass heats up, volatiles (VOC's), which would otherwise combust in the presence of oxygen, are given off of the biomass product and rise within the tube 126. The tube 126 can be fully sealed such that the volatiles are condensed, or, the volatiles can be combusted within the furnace to further provide heat/energy within the furnace 102.

As seen in FIG. 1, the tube 126 can include a volatile port 130 near the top of the tube 126 that provides a low pressure outlet for volatiles to be released from within the tube 126 to a space within the furnace 102 where the volatiles can combust and provide energy to further aid pyrolysis. In this arrangement, the furnace 102 operates as normal with the added benefit of pyrolyzing the biomass product within the tube 126 while the volatiles from the biomass product provide additional energy to the heating process. In this way, the pyrolysis of the biomass product is driven at least partially by the gasification of the biomass product and the combustion of the syngas within the furnace 102 of the system 100. The volatile port 130 may be a tubular member (e.g., tube steel) that includes a first opening within the drop tube 126 and a second opening within the chamber 103 of the furnace 102. As seen in FIG. 1, the second opening may be located near a bottom portion of the drop tube 126 and the first opening may be located near a top portion of the drop tube 126. The top portion of the drop tube 126 may be on a top half and the bottom portion of the drop tube 126 may be on a bottom half of the drop tube. The vertical location of the volatile port's 130 first opening on the drop tube 126 may be positioned at different heights to selectively capture certain specific gas components. For example, certain gas components may be fractioned for certain high value uses, while other gas components are ignited within the furnace to provide thermal energy within the furnace.

In certain instances, there may be multiple volatile ports 130 at different positions on the drop tube 126. For example, there may be multiple volatile ports 130, where each port 130 is at different heights on the tube 126. Thus, the user may choose which, if any, volatile ports 130 to open and which to close. And, the volatile ports 130 may include a junction where the user can select if the volatiles will ignite within the furnace 102 or be routed to another area outside the furnace 102, for example, in a gas generation system (e.g., wood gas generator). Alternatively, the volatile ports 130 may not include a junction, but there may simply be multiple ports 130 with some allowing for ignition within the furnace and some ports 130 extending out of the furnace to, for example, the gas generation system.

With the volatile ports 130 being able to open and close (i.e., gasification be turned on or off), the user can choose to close all ports 130, for example, and run a continuous pyrolytic operation where the pyrolysis is exothermic. Alternatively, the user can choose to open the ports 130 and allow the volatiles to ignite within the furnace 102, whereby the gasification further drives the pyrolysis by increasing the thermal energy in the reactor. In certain instances, the system 100 may be configured to operate at a certain temperature within the furnace 102. The system 100 may use open the volatile ports 130 to increase the temperature within the furnace 102 and, when the certain temperature within the furnace is reached, the volatile ports 130 may be closed or re-routed to another operation (e.g., liquid gas generation, offgassing), for example.

The system 100 can operate as a self-sustaining feedback loop where the amount of output energy required by furnace 102, which is set by the biomass facility, is balanced between the input energies from the biomass pyrolysis and the external energy (e.g., natural gas). For example, the furnace 102 may operate without the reactor 108 in operation, such that the energy input may be entirely dependent on the external energy sources, such as natural gas, saw dust, biomass, pulverized coal, etc. When the furnace 102 operates with the reactor 108 also in operation, however, the energy input may be split between the external energy sources and the volatiles from the reactor 108. Thus, the external energy may be decreased to accommodate the energy inputted from the combustion of the volatiles of the biomass product. Various mechanisms can be used to balance the input energies. For example, a conventional control system may be used to regulate the energy supplied from the external energy source to accommodate potential fluctuations of energy supplied from pyrolysis, all the while maintaining a consistent output of energy.

After a sufficient amount of time to pyrolyze the biomass, the activated carbon/biochar/fixed carbon can be conveyed out of the bottom of the tube 126 via a lower conveyor mechanism 132. The hollow interior of the drop tube 126 may, for example, feed into an inner portion of a horizontally positioned tube 134 that conveys the activated carbon out of the interior of the furnace 102. Once the activated carbon is conveyed out of the drop tube 126, additional biomass product can be conveyed from the hopper 116 into the opening of the drop tube 126, and the additional biomass product can be pyrolyzed. Alternatively, the system 100 can be continuous. That is, a steady flow of biomass product can be delivered into the drop tube 126 and a steady flow of activated carbon/biochar can be outputted from the drop tube 126. In this type of continuous system, the biomass product will be at differing elevations in the drop tube 126 during its duration in the drop tube 126. This may facilitate uniform pyrolysis of the biomass product since all products within the tube 126 will follow the same cycle or time at the various elevations within the tube 126. This may aid in uniform pyrolysis because the temperature within the furnace 102 is not likely to be consistent throughout, especially if the volatiles are burned within the furnace via the volatile port 130. The furnace 102 will likely have a temperature spike at the area within the furnace 102 that the volatile port 130 opens up.

Referring back to the horizontally positioned exit tube 134, steam or water may be introduced at some point in the horizontal tube 134. The steam or water can be used to squelch the carbon or can be used to activate the carbon (i.e., expand pore space).

Moving on to certain embodiments of the various assemblies and referring to FIG. 2, which is an isometric view of an alternative configuration of components of the system for pyrolysis of a biomass 100, the conveyor assembly 120 includes a pair of auger shafts 122 that are powered by a mechanism outside the furnace 102 that are fully controllable. The auger shafts 122 extend into the housing 118 of the conveyor assembly 120 and are coupled with or formed with augers 123 that rotate and convey the biomass product from the bottom of the hopper 116 to the drop tube 126. As the shafts 122 and the augers 123 rotate, the biomass product travels along the flighting of the augers 123 and deposits in the opening of the drop tube 126. While FIG. 2 depicts a pair of shafts 122 and augers 123, the conveyor assembly 120 can similarly include pneumatic mechanisms (e.g., piston system) to drive the biomass product from the hopper 116 to the opening of the drop tube 126. Alternatively, the conveyor assembly 120 can include a conveyor belt (not shown) to transfer the biomass product from the hopper 116 to the drop tube 126. As another alternative, the hopper 116 can be positioned above the drop tube 126, thus, eliminating the need for a horizontal conveyor assembly 120.

Moving on to the drop tube 126 of the reactor 108 and still referring to FIG. 2, the reactor 108 may include a lid 136 on a top portion of the drop tube 126. The lid 136 may provide an airtight or nearly airtight seal between an interior portion of the drop tube 126 and the ambient air outside the drop tube 126. The lid 126 may be releasably attached to the drop tube 126 via corresponding threading on the tube 126 and the lid 136, or the lid 136 may be permanently fastened to the tube 126 by welding, for example.

To help ensure uniform pyrolysis of the biomass product, the agitation mechanism 128 in the embodiment of FIG. 2 includes a shaft 138 that extends through the length of the drop tube 126 and extends through an opening in the lid 136. The portion of the shaft 138 that extends through the lid 136 may be coupled to a motor or other mechanism capable of rotating and/or vertically displacing the shaft 138 within the drop tube 126. The shaft 138 includes an auger-type blade 140 that is coupled to the shaft 138. The auger-type blade 140 is a continuous flighting or spaced flighting that spirals along the shaft 138 from a bottom portion of the shaft 138 to a top portion of the shaft 138.

Figure 3:
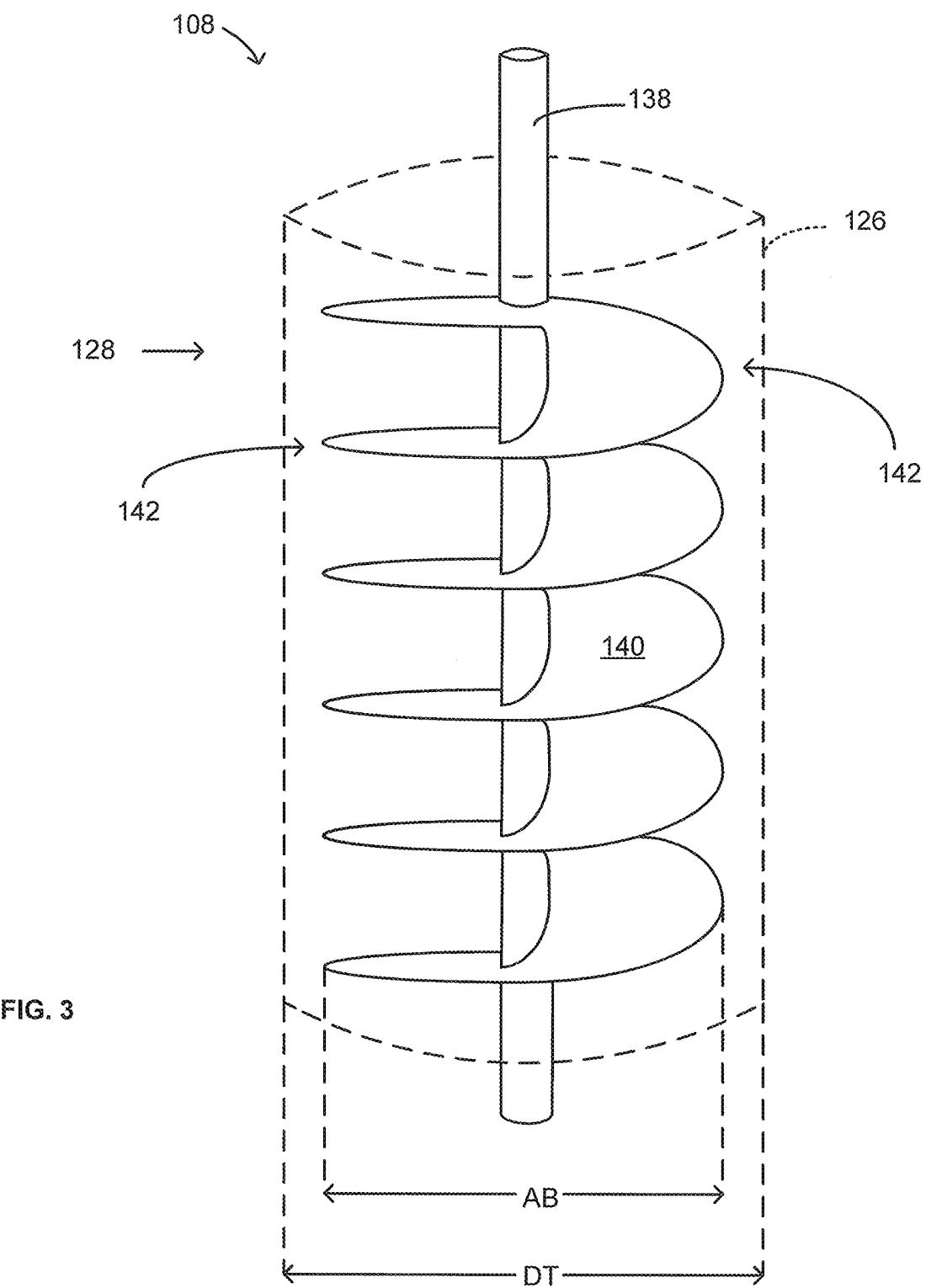
FIG. 3 depicts a close-up view of a portion of a reactor.

Referring to FIG. 3, which is a close-up view of a portion of the drop tube 126, the auger-type blade 140 includes a diameter AB that is less than an inner diameter DT of the drop tube 126. Thus, as the biomass product is received through the opening of the drop tube 126, the biomass product falls within a gap 142 defined between the inner diameter DT of the drop tube 126 and the outer edge of the auger-type blade 140. Some of the biomass product will fall to the bottom of the drop tube 126 and some of the biomass product will stack on a top surface of the auger-type blade 140. As the biomass product is progressively received within the tube, a pile of biomass product will form at the bottom of the drop tube 126 and, thus, encompass a portion of the length of the shaft 138 and the auger-type blade 140. To agitate the biomass product within the drop tube 126, the motor coupled to the shaft 138 may vertically displace the shaft in an oscillatory fashion or any other fashion suitable to agitate the biomass product. In this way, the portion of the auger-type blade 140 that is encompassed by the pile of biomass product lifts and releases or "fluffs" the biomass product within the drop tube 126. Thus, the auger-type blade 140 agitates the portion of the pile of biomass product that is centrally located above and below the diameter AB of the auger-type blade 140. And, the portion of the pile of biomass product that is adjacent the inner wall of the drop tube 126 (i.e., the biomass product in the gap 142) falls into the central portion of the drop tube 126 such that it will be agitated further by the movement of the shaft 138 and auger-type blade 140.

Figure 4:
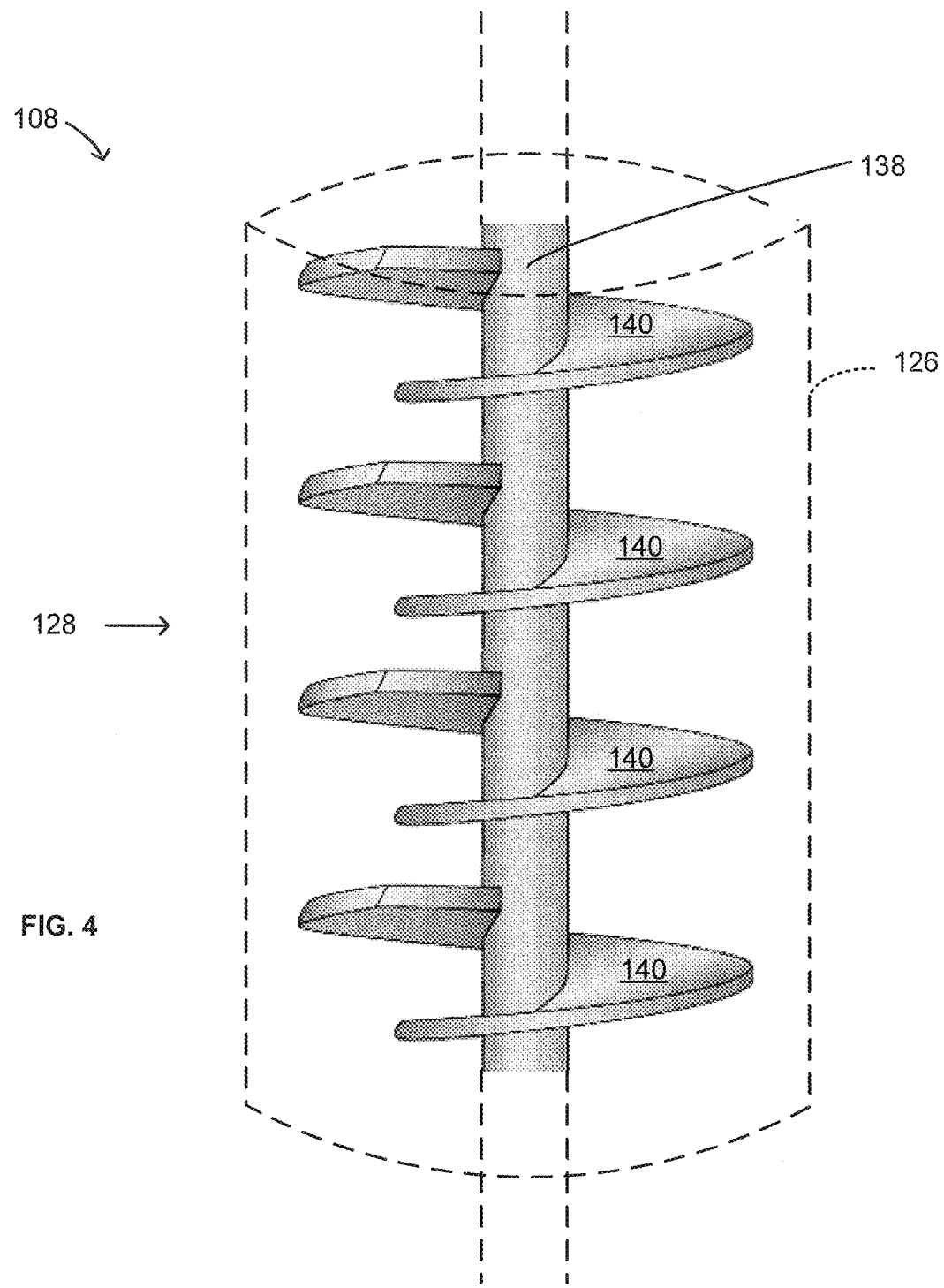
FIG. 4 depicts a close-up view of a portion of another reactor.

While FIGS. 2-3 depict an auger-type blade 140 coupled to the shaft 138, other types of blades, flighting, or devices may be coupled to the shaft 138 to accomplish the same function. Moreover, while FIGS. 2-3 depict the auger-type blade 140 extending the full length of the shaft 138, the auger-type blade 140 may only extend a portion of the shaft 138 and still function to agitate the biomass product within the drop tube 126. As seen in FIG. 4, the auger-type blade 140 is not a continuous blade, but, rather, includes discrete sections of auger flighting or helical-type blades. In this arrangement, there is less material from the auger-type blade 140 occupying space (i.e., volume) within the drop tube 126, thus, there is more room for biomass product to pyrolyze. As an example, each auger-type blade 140 can be space apart about one foot.

Figure 5:
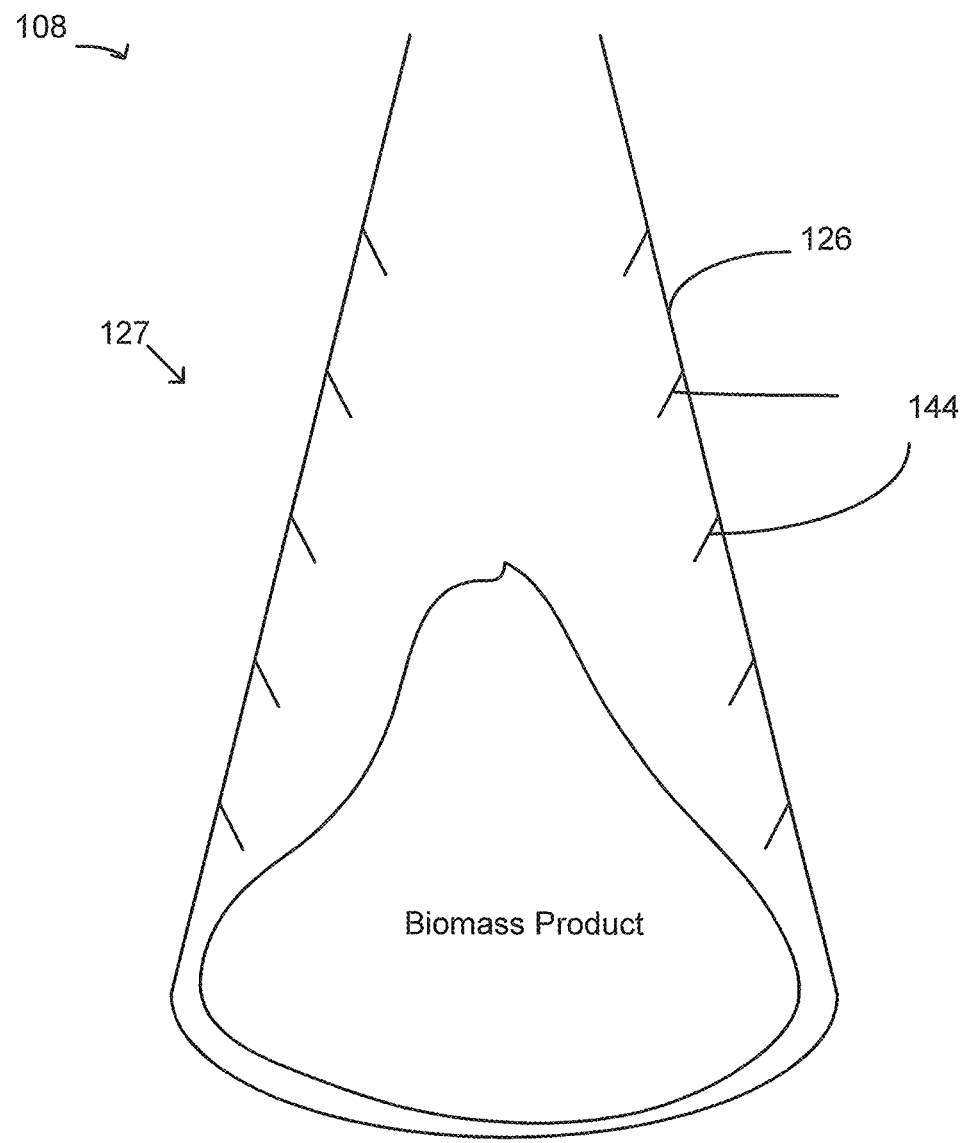
FIG. 5 depicts a close-up view of a portion of another reactor.

Moving on to different configurations of the drop tube 126 and referring to FIG. 5, the drop tube 126 may include a conical tube structure 127 that radially expands at a bottom portion of the drop tube 126. The drop tube 126 may additionally include fixed flighting 144 that is coupled to the inner walls of the drop tube 126. The fixed flighting 144 may be "angle iron" that is welded or otherwise formed on an inner wall of the drop tube 126. The purpose of the fixed flighting 144 is to direct the biomass product to a central portion of the drop tube 126 as the biomass product falls within the drop tube 126. The drop tube 126 may or may not include an agitation mechanism 128, such as a shaft 138 with an auger-type blade 140, in this embodiment. Further, the entire length of the drop tube 126 may be conical, or a portion of the drop tube 126 may be cylindrical and only a bottom portion of the drop tube 126 may be conical.

Referring back to FIG. 2 and the drop tube 126, the volatile ports 130 can alternatively include boreholes through the thickness of the drop tube 126. Accordingly, as volatiles are released off of the biomass product during pyrolysis, the gases are drawn to the low pressure zone formed by the boreholes of the volatile ports 130. The gases, thus, exhaust out of the drop tube 126 and combust in the presence of the oxygen in the chamber 103 of the furnace 102. The number and/or size of volatile ports 130 can vary depending on the size of the drop tube 126 and can be positioned in various positions along the length of the drop tube 126 depending on the needs of the particular system.

Once the biomass product has been pyrolyzed, the activated carbon may be removed from the chamber 103 of the furnace 102 via the lower conveyor system 132. As seen in FIG. 2, the lower conveyor system 132 may be coupled to the end of the drop tube 126 and may include a sleeve 146 that is tubular steel, or similar material, that is slightly larger than the drop tube 126 in order to receive the bottom end of the drop tube 126 within the sleeve 146. Just below the sleeve 146, an angle element 148 directs the biomass product as it falls into an opening 150 in the horizontally positioned tube 134. Within the horizontally positioned tube 134 can be an auger (not shown) or other conveying mechanism that moves the biomass product from the opening 150 to an outer end 152 of the horizontally positioned tube 134. The outer end 152 of the tube 134 can be located outside of the chamber 103 of the furnace 102 and the auger may be powered by a motor or similar mechanism also located outside of the furnace 102.

Once the biomass product exits the outer ends 152 of the tube 134, the product may be conveyed or driven (e.g., pneumatically) to other areas of the facility for bagging, for example. In certain embodiments, the exhausting air from the separator exhaust port 114 located at the top of the separator 112 can be used to pneumatically drive or move the biomass product from the ends 152 of the tube 134 into another area of the facility. The exhausting air from the separator exhaust port 144 may, for example, be piped to the outer end 152 of the tube 134 and joined with the tube 134 at a junction such that the exhaust air causes the biomass product to travel down a tube (not shown), subsequent to the junction, to the bagging area of the facility.

Turning now to exemplary dimensions of the reactor 108, as stated previously, the drop tube 126 can be tube steel. The diameter of the drop tube 126 can be about six inches to about forty-eight inches and a height of the drop tube 126 can be about ten feet to about forty feet from the base of the furnace 102 to the bottom of the horizontal conveyor assembly 120. The height will depend on the configuration of the furnace 102, and can be modified as such. Referring to FIG. 3, the size of the gap 142 defined between the inner diameter DT of the drop tube 126 and the outer edge of the auger-type blade 140 will depend on the size of the biomass product. As an example, for a system using wood chips, the gap 142 may be about 3 inches.

An exemplary pyrolysis system 100 may function as follows. A drop tube 126 may be tubular with a height of twenty-five feet and a width of two feet. The drop tube 126 may house about sixty cubic feet of a biomass feedstock having about ten percent moisture content. The biomass feedstock may be of a uniform size of sawdust size to about ⅛ inch by one inch by one inch. The system 100 described herein may include a step of filtering the biomass with, for example, a screen or screens such that only certain sizes (e.g., 1"×1"×⅛", 2"×2"×¼", 3"×3"×⅜") of feedstock are selected for use within the system 100. Additionally, the system 100 may operate continuously with a constant or substantially constant input of biomass feed stock and output of activated carbon/biochar. The retention time for the biomass feed stock may be about forty-five to fifty minutes. That is, the biomass feedstock will be in the drop tube 126 for about forty-five to fifty minutes beginning at the time the feedstock enters the top of the drop tube 126 till the time the feedstock exits the bottom of the tube 126. The top of the drop tube 126 may be subjected to temperatures in the furnace of within a range of about 300 degrees Fahrenheit to about 700 degrees Fahrenheit and the bottom of the tube 126 may be subjected to temperatures within a range of about 1,500 degrees Fahrenheit to about 2,500 degrees Fahrenheit at the area where the volatiles are ignited via the volatile port 130.

The system 100 described in reference to FIGS. 1-5 can be used on any fibrous material and is particularly suitable for biomass production facilities and biomass power generations plants. To generate activated carbon from the biomass product, and using the system 100 of FIGS. 1-5, the biomass product may be pyrolyzed for between about ten minutes and about forty minutes. The amount of dwell time is dependent on the temperature in the furnace 102 as well as the moisture content of the biomass product at the start of the process.

While the system 100 described herein is described as being suitable for use with an existing biomass production facility or power generation plant, the system 100 may be dedicated to producing activated carbon/biochar as a primary product. For example, the system 100, as seen in FIG.

1, can be scaled to fit on a portable trailer such that an operator can tow the trailer to a poultry farm, for example, and convert the poultry waste, litter, manure, and bedding, among other waste products, into an activated carbon/biochar. In this scenario, the poultry waste is the primary biomass feedstock for the system 100 and activated carbon/biochar is the primary product. The system 100 may include a dryer to consistently dry the poultry waste to a consistent moisture content prior to beginning the pyrolyzation process. And while the system 100 described herein is described as being used in a wood product biomass facility, the system 100 may be used in other facilities without limitation. For example, the system 100 may be used in a nut or nut shell processing facility where the nut shell is dried with the furnace air and is carbonized in the reactor to produce a carbonized nut shell product. In another example, the system 100 may be used to re-process spent carbon. As another example and in addition to the production of char, fixed carbon, activated carbon, etc., the system 100 may be used to dry and desiccate sludge.

Figure 6:
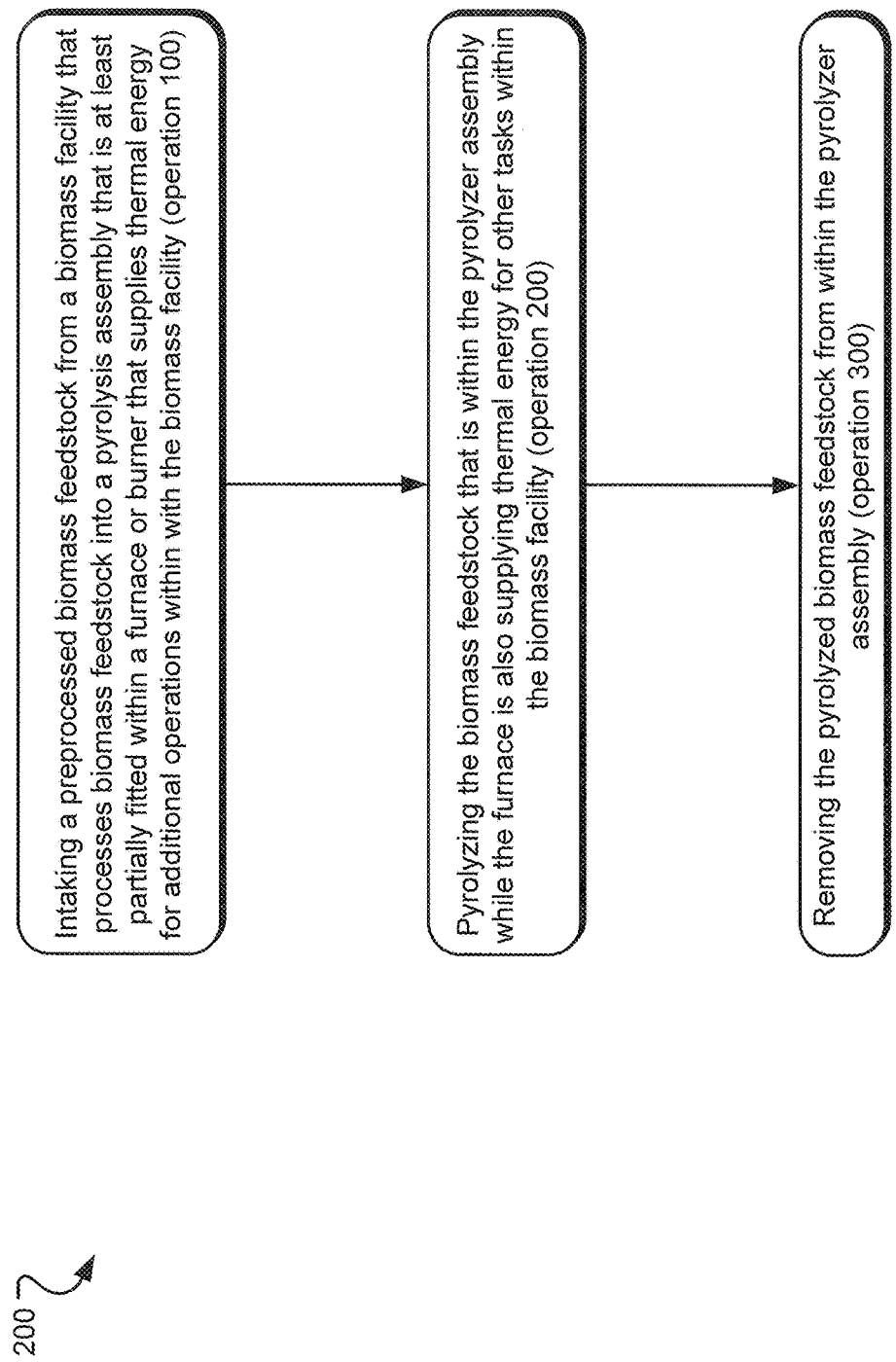
FIG. 6 depicts a flowchart of a process of pyrolyzing a biomass.

Referring now to a process of producing activated carbon by pyrolysis of a biomass product and referring to FIG. 6, the process 200 may include intaking a preprocessed biomass feedstock from a biomass facility into a reactor 108 (operation 100). This operation may include a reactor 108 that is fitted at least partially within the chamber 103 of a furnace or burner 102 associated with the biomass facility. Or, the reactor 108 may use thermal energy from the biomass facility while not being located within the furnace 102. Additionally, the preprocessed biomass feedstock may be a byproduct of the biomass facility. The process 200 may also include pyrolyzing the preprocessed biomass feedstock within the reactor 108 (operation 200). This operation may include pyrolyzing the preprocessed biomass feedstock while the furnace 102 is additionally supplying thermal energy for additional functions within the biomass facility, such as, for example, drying wood chips/pellets or lumber. This operation may additionally include channeling the volatiles from within the reactor 108 to a space outside of the pyrolyzer 108 and within the chamber 103 of the furnace 102 for combustion. The process 200 may also include removing the pyrolyzed preprocessed biomass feedstock from within the reactor 108, such as a space outside of the furnace 102.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., top, bottom) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for pyrolysis of a biomass, the system comprising:
   a furnace comprising a combustion chamber, the furnace configured for generating thermal energy from combustion within the combustion chamber and supplying the thermal energy to at least one operation within a biomass facility;
   a reactor comprising a pyrolysis chamber configured to house a preprocessed biomass feedstock therein, the pyrolysis chamber comprising a tubular body that is vertically positioned at least partially within the combustion chamber of the furnace such that the preprocessed biomass feedstock is pyrolyzed by the thermal energy within the combustion chamber of the furnace, the pyrolysis chamber comprising an auger disposed vertically within the tubular body, the auger comprising a shaft extending a length and flighting extending from the shaft and extending at least a portion of the length of the shaft, the auger configured for mixing at least a portion of the preprocessed biomass feedstock within the pyrolysis chamber; and
   a motor operably coupled to the auger, the motor configured to vertically displace the auger within the pyrolysis chamber so as to vertically displace the preprocessed biomass feedstock housed therein.

2. The system of claim 1, wherein the pyrolysis chamber further comprises a first volatile port comprising a first opening within the pyrolysis chamber and a second opening within the combustion chamber of the furnace, the first volatile port configured to provide a passageway for volatiles to travel from the first opening to the second opening for combusting within the combustion chamber.

3. The system of claim 2, wherein the first opening is near a top portion of the pyrolysis chamber and the second opening is near a bottom portion of the pyrolysis chamber.

4. The system of claim 2, wherein the pyrolysis chamber further comprises a second volatile port comprising a third opening within the pyrolysis chamber and a fourth opening within the combustion chamber of the furnace, the second volatile port configured to provide a second passageway for the volatiles to travel from the third opening to the fourth opening for combusting within the combustion chamber.

5. The system of claim 1, wherein the biomass facility processes the preprocessed biomass feedstock prior to being housed within the pyrolysis chamber.

6. The system of claim 5, wherein the processing includes drying the biomass feedstock to a substantially uniform moisture content.

7. The system of claim 6, wherein the moisture content is within about 5% to about 20% by weight.

8. The system of claim 5, wherein the processing includes selecting a uniform size of the biomass feedstock.

9. The system of claim 8, wherein the uniform size is about ⅛ inch by about 1 inch by about 1 inch.

10. The system of claim 1, wherein the at least one operation includes drying the preprocessed biomass feedstock prior to being housed in the pyrolysis chamber.

11. The system of claim 1, wherein the biomass facility is a biomass production facility or a biomass power generation plant.

12. The system of claim 1, wherein the pyrolysis chamber is a substantially oxygen deprived environment.

13. The system of claim 1, wherein the pyrolysis chamber is vertically positioned within a central portion of the combustion chamber.

14. The system of claim 1, wherein the preprocessed biomass feedstock is wood chips or wood pellets.

15. The system of claim 1, wherein the preprocessed biomass feedstock is animal waste.

16. The system of claim 1, wherein the flighting is non-continuous.

17. A system for pyrolysis of a biomass, the system comprising:
- a furnace comprising a combustion chamber, the furnace configured for generating thermal energy from combustion within the combustion chamber and supplying the thermal energy to at least one operation within a biomass facility; and
- a reactor comprising a pyrolysis chamber configured to house a preprocessed biomass feedstock therein, the pyrolysis chamber comprising a tubular body that is vertically positioned at least partially within the combustion chamber of the furnace such that the preprocessed biomass feedstock is pyrolyzed by the thermal energy within the combustion chamber of the furnace, the pyrolysis chamber further comprising a volatile port comprising a tubular member providing a direct conduit between a top portion of the pyrolysis chamber and a bottom portion of the combustion chamber for volatiles to move from the pyrolysis chamber to the combustion chamber without intervening connections to conduits from outside the combustion chamber, the tubular member having a first opening within the pyrolysis chamber and a second opening within the combustion chamber.

18. The system of claim 17, wherein the volatiles are configured to move from the pyrolysis chamber to the combustion chamber solely via a pressure gradient between a first opening of the tubular member within the pyrolysis chamber and a second opening of the tubular member within the combustion chamber.

19. The system of claim 18, further comprising a motor operably coupled to the auger, the motor configured to rotationally displace the auger within the pyrolysis chamber so as to vertically displace the preprocessed biomass feedstock housed therein.

20. The system of claim 17, wherein the at least one operation includes drying the preprocessed biomass feedstock prior to being housed in the pyrolysis chamber.

21. The system of claim 17, wherein the biomass facility is a biomass production facility or a biomass power generation plant.

22. The system of claim 17, wherein the pyrolysis chamber further comprises an auger disposed vertically within the tubular body, the auger comprising a shaft extending a length and flighting extending from the shaft, the flighting extending at least a portion of the length of the shaft, the auger configured for mixing at least a portion of the preprocessed biomass feedstock within the pyrolysis chamber.

23. The system of claim 22, further comprising a motor operably coupled to the auger, the motor configured to vertically displace the auger within the pyrolysis chamber so as to vertically displace the preprocessed biomass feedstock housed therein.

24. The system of claim 22, further comprising a motor operably coupled to the auger, the motor configured to rotationally displace the auger within the pyrolysis chamber so as to vertically displace the preprocessed biomass feedstock housed therein.

25. The system of claim 17, wherein the flighting is non-continuous.

* * * * *